United States Patent
Powell

(10) Patent No.: US 10,759,017 B2
(45) Date of Patent: Sep. 1, 2020

(54) GLIDEWAY CROWNING PLATE AND METHOD THEREOF FOR CREATING A CROWN ON A CUTTING EDGE OF A CUTTING BLADE WITH A SHARPENING JIG

(71) Applicant: David G. Powell, Needham, MA (US)

(72) Inventor: David G. Powell, Needham, MA (US)

(73) Assignee: David G. Powell, Needham, MA (US)

( * ) Notice: Subject to any disclaimer, the term of this patent is extended or adjusted under 35 U.S.C. 154(b) by 308 days.

(21) Appl. No.: 15/934,143

(22) Filed: Mar. 23, 2018

(65) Prior Publication Data
US 2019/0291231 A1 Sep. 26, 2019

(51) Int. Cl.
| | | |
|---|---|---|
| B24B 9/04 | (2006.01) | |
| B24D 15/06 | (2006.01) | |
| B24B 3/38 | (2006.01) | |
| B23Q 16/08 | (2006.01) | |

(52) U.S. Cl.
CPC ............... *B24B 9/04* (2013.01); *B23Q 16/08* (2013.01); *B24B 3/38* (2013.01); *B24D 15/06* (2013.01)

(58) Field of Classification Search
CPC .. B24B 9/04; B24B 3/38; B23Q 16/08; B24D 15/06
USPC ................... 451/349, 555, 558, 45
See application file for complete search history.

(56) References Cited

U.S. PATENT DOCUMENTS

| | | | | |
|---|---|---|---|---|
| 2,128,591 | A * | 8/1938 | McGill ................. | B24D 15/06 451/321 |
| 2,131,626 | A * | 9/1938 | Keith ..................... | B24D 15/06 451/321 |
| 4,733,501 | A * | 3/1988 | McLean ................ | B24D 15/06 451/371 |
| 5,195,275 | A * | 3/1993 | McLean .................... | B24B 3/36 269/160 |
| 5,431,068 | A * | 7/1995 | Alsch ..................... | B24B 41/066 269/3 |
| 5,582,542 | A * | 12/1996 | Stein ....................... | B24B 15/06 451/367 |
| 5,810,649 | A * | 9/1998 | Oar ........................ | B24D 15/06 451/278 |
| 5,944,592 | A * | 8/1999 | Hall .......................... | B24B 3/36 451/162 |
| 6,030,281 | A * | 2/2000 | Cozzini ................... | B24B 41/06 451/312 |
| 7,104,876 | B1 * | 9/2006 | Lin ......................... | B24D 15/06 451/312 |
| 7,387,562 | B1 * | 6/2008 | Blum .................... | B24D 15/08 451/380 |

(Continued)

Primary Examiner — George B Nguyen
(74) Attorney, Agent, or Firm — Iandiorio Teska & Coleman, LLP

(57) ABSTRACT

A glideway crowning plate for creating a crown on a cutting edge of a cutting blade with a sharpening jig including a glideway crowning plate having a concaved curved surface of a predetermined radius placed proximate spaced glides of a sharpening jig. The sharpening jig utilizes a flat sharpening plate or a flat sharpening stone and the sharpening jig is side-stroked on the flat sharpening plate or the flat sharpening stone and the glideway crowning plate imposes a curved path of the predetermined radius on the sharpening jig, the cutting blade, and the flat sharpening plate or the flat sharpening stone to create a crown in the cutting edge of a cutting blade.

10 Claims, 17 Drawing Sheets

(56) References Cited

U.S. PATENT DOCUMENTS

| | | | | |
|---|---|---|---|---|
| 7,549,910 B2* | 6/2009 | Stanley | ................ | B24B 41/066 |
| | | | | 451/170 |
| 7,553,216 B2* | 6/2009 | Hyde | ........................ | B24B 3/38 |
| | | | | 451/371 |
| 8,197,304 B2* | 6/2012 | Hummel | ................ | B24D 15/06 |
| | | | | 451/380 |
| 8,549,316 B2 | 9/2013 | Powell | | |
| 9,221,144 B2 | 12/2015 | Powell | | |
| 2006/0057946 A1* | 3/2006 | Evans | .................... | B24D 15/06 |
| | | | | 451/45 |
| 2007/0026771 A1* | 2/2007 | Harden | .................... | B24B 3/46 |
| | | | | 451/45 |
| 2009/0004956 A1* | 1/2009 | Smith | ...................... | B24B 3/38 |
| | | | | 451/371 |
| 2009/0318066 A1* | 12/2009 | Clay | ........................ | B24B 3/36 |
| | | | | 451/369 |
| 2014/0342644 A1* | 11/2014 | Hasegawa | .............. | B24D 15/08 |
| | | | | 451/369 |

* cited by examiner

GLIDEWAY CROWNING PLATE AND METHOD THEREOF FOR CREATING A CROWN ON A CUTTING EDGE OF A CUTTING BLADE WITH A SHARPENING JIG

FIELD OF THE INVENTION

This invention relates to a glideway crowning plate and method thereof for creating a crown on a cutting edge of a cutting blade with a sharpening jig.

BACKGROUND OF THE INVENTION

As disclosed in U.S. Pat. No. 8,549,316, by the inventor hereof, and incorporated by reference herein, a hand plane is very important to woodworkers and furniture makers because it may be one of the best tools for creating a finished flat surface on wood. Superior results may be achieved with the hand plane because the wood fibers are cleanly severed, not torn, which creates a smooth, continuous surface ready for finishing. This is true even where the surface comprises two or more separate boards that have been joined side-by-side to create a larger piece.

In fine woodworking, the cutting blade of a hand plane preferably includes a crown on a cutting edge to impart the final surface finish. Such crowned cutting blades cut a shaving from a wide board of wood, leaving no noticeable ridges in the wood because the shaving produced will be thickest along a longitudinal center line and gradually taper in thickness to nothing in the lateral directions, left and right of the center line of the shaving. The crowned cutting edge of the cutting blade of the hand plane prevents any trails in the wood which are detectable by feel or appearance. A wood surface properly planed with a crowned cutting blade will be continuous and smooth and will reveal the grain and color of the wood.

Sharpening a cutting blade of a hand plane iron to create a crown in the cutting edge of the blade that prevents trails in wood surfacing, finishing, and smoothing is a difficult procedure.

One improved method for creating a crown in the cutting blade of a hand plane disclosed in the '316 patent discussed above relies on providing a diamond-coated sharpening plate having a concave surface of a large radius, e.g., in the range of about 150 inches to about 600 inches that is located along the width of sharpening plate. A crown in the cutting edge of the hand plane iron is formed when the bevel of the hand plane iron is stroked fore-and-aft longitudinally against the sharpening surface of the sharpening plate with the cutting edge approximately perpendicular to the cylindrical axis of the cylindrical curvature.

Over the history of hand tools in woodworking, especially those tools with cutting blades or knife edges, sharpening has been done by scratching away fine particles of metal from the intersecting faces which form the edge. These scratches were typically created by abrasive grit in natural stones. Refinements to abrasive grit in natural stones included harder steel edge and harder grit in a series of progressively finer particles. In recent times, man-made diamond is often utilized in manual sharpening of cutting blades because diamond is the hardest and most durable of abrasive grits. Diamond-coated sharpening plates typically include a steel plate that has a top surface having the large radius as disclosed in the '316 that is electroplated diamond. The diamond-coated sharpening plates may have various grit sizes, e.g., 60µ, 45µ, 25µ, and 91µ. Polishing cutting blades is typically done with water stones and leather strops.

Chisels are less of a challenge to sharpen because their edges are straight. As discussed above, the cutting blade of a hand plane will leave trails in smoothing broad wood surfaces if the cutting edge of the cutting blade is straight. Slightly curving the cutting edge of cutting blade to create a crown, often referred to as crowning, that prevents trails is challenging.

One conventional method of crowning typically practiced by full time professional woodworkers relies on off-hand grinding a flat bevel of a cutting blade at about 25° on a grind wheel followed by off-hand curving during honing and polishing on flat grit surfaces with lateral force shifts. This force shifting requires significant skill and the crowns created in the cutting blade may be inconsistent.

In current times, hobbyist woodworkers outnumber professional woodworkers. Thus, the need for improved sharpening techniques to create a crown in the cutting edge of a cutting blade that require less skill, less expense, and less time is paramount. The hobbyist woodworker typically prefers spending less time sharpening and more time working the wood.

With durable-coated sharpening plates discussed above and the need for improved sharpening techniques to create a crown in the cutting edge of a cutting blade that requires less skill and time, the curved diamond-coated sharpening plates as disclosed in '316 patent attracted market interest. However, the large-sized, curved, diamond-coated sharpening plates as disclosed in the '316 patent, added costs. In response, smaller, narrow-width diamond-coated sharpening plates where developed such that the curve having a large radius is located along the length of diamond-coated sharpening plate. The new design enabled side-stroking and reduced the width of the sharpening plate by half; which reduced the cost by half. Side-stroking proved difficult for many hobbyist woodworkers relying on off-hand methods without any type of sharpening jig.

A sharpening jig may be used to create a crown on the cutting edge of a cutting blade to overcome the problems discussed above. One conventional sharpening jig is disclosed in U.S. Pat. No. 9,221,144, by the inventor hereof, incorporated by reference. As disclosed in the '144 patent, the sharpening jig for a cutting blade includes a baseplate, a protractor plate, an incline plate for securing a cutting blade and defining a sharpening angle, a push plate to position user applied force and reduce do-stabilizing moments. The sharpening jig also includes one or more glides, riding the bench top rather than the grit surface, located pt the back of the sharpening jig, configured to longitudinally and/or laterally level the baseplate with respect to a level abrasive surface of the sharpening base to allow movement of the jig by a user to create a crown in the cutting edge of the cutting blade.

In one example, to sharpen a cutting blade and create a crown on the cutting edge of the cutting blade with the sharpening jig as taught by '144 patent, or similar type sharpening jig, a large-sized diamond-coated sharpening plate or stone having concave surface with a large radius, e.g., in the range of about 150 inches to about 600 inches, is placed proximate the front of the sharpening jig. The one or more glides at the back of the jig as disclosed in the '144 patent longitudinally and/or laterally level the base plate of the sharpening jig with respect to the level abrasive surface of the large-sized diamond-coated sharpening plate to allow stroking in all horizontal orientations by a user. The sharpening jig is moved fore-and-aft in a longitudinal direction over the large-sized concave shaped diamond-coated sharpening plate or stone to create the crown on the cutting edge of the cutting blade. In one example, the large-sized diamond-coated sharpening plate or stone is approximately 10 inches in length and has a width of a width of about 4 inches, or similar large-size known to those skilled in the art. However, the large-sized diamond-coated sharpening plate or stone is very expensive.

To reduce the cost associated with large-sized sharpening plates or stones, a series of smaller, narrow-width diamond-coated sharpening plates having progressively smaller grit sizes each having concave surface with a similar large radius may be utilized with the sharpening jig as disclosed in the '144 patent, or similar type sharpening jig. In one example, each of the smaller diamond-coated sharpening plates are approximately 8 inches in length and have a width of about 1½ inches.

In operation, the sharpening jig with the cutting blade are side-stroked on the curved surface of the smaller-sized diamond-coated plate to sharpen the cutting blade and create a crown in the cutting edge of the cutting blade. Similarly, the glides at the back of the jig as disclosed in the '144 patent adjust to levels the base plate of the sharpening jig with respect to the level abrasive surface of the small-sized diamond-coated sharpening plate to allow movement of the jig in all horizontal directions by a user to create the sharpened edge on the cutting blade with a crown. However, even the smaller sized diamond-coated sharpening plates are expensive.

Most hobbyists and professional woodworkers own conventional typically inexpensive flat sharpening plates and stones. Thus, there is a need for a system and method which can utilize conventional inexpensive flat sharpening plates and stones with a sharpening jig to easily and effectively create a crown on the cutting edge of the cutting blade for a hand plane without the need for expensive concave shaped diamond-coated sharpening plates or stones.

SUMMARY OF THE INVENTION

In one aspect, a glideway crowning plate for creating a crown on a cutting edge of a cutting blade with a sharpening jig is featured. The glideway crowning plate includes a glideway crowning plate having a concaved curved surface of a predetermined radius placed proximate spaced glides of a sharpening jig. The sharpening jig with a cutting blade therein utilizes a flat sharpening plate or a flat sharpening stone and the sharpening jig is side-stroked on the flat sharpening plate or flat sharpening stone and the glideway crowning plate imposes a curved path of the predetermined radius on the sharpening jig, the cutting blade, and flat sharpening plate or flat sharpening stone to create a crown in the cutting edge of a cutting blade.

In one embodiment, the radius may include a radius in the range of about 180 inches to about 480 inches. The predetermined radius may have a radius of approximately 450 inches. The glideway crowning plate may be made of steel. The glideway crowning plate may have a length of about 8 inches, a width of about 1.5 inches and a thickness of about ¼ inches. The glideway crowning plate may include a drop-off prevention device configured to prevent unintended drop-offs and shifting during sharpening. The spaced glides of the sharpening jig may be spaced further than the width of the cutting blade.

In another aspect, a method for creating a crown on the cutting edge of a cutting blade with glideway crowning plate and a sharpening jig is featured. The method includes providing a glideway crowning plate including a concave surface of a predetermined radius. The glideway crowning plate is placed proximate spaced glides of the sharpening jig. A flat sharpening plate or a flat sharpening stone is placed proximate the front of the sharpening jig. The sharpening jig with a cutting blade secured thereto is side-stroked on the flat sharpening stone or the flat sharpening plate such that the glideway crowning plate imposes a curved path of a predetermined radius on the sharpening jig, the cutting blade, and the flat sharpening plate or flat sharpening stone to create a crown in the cutting edge of cutting blade.

In one embodiment, the predetermined radius may include a radius in the range of about 180 inches to about 480 inches. The predetermined radius may have a radius of approximately 450 inches.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
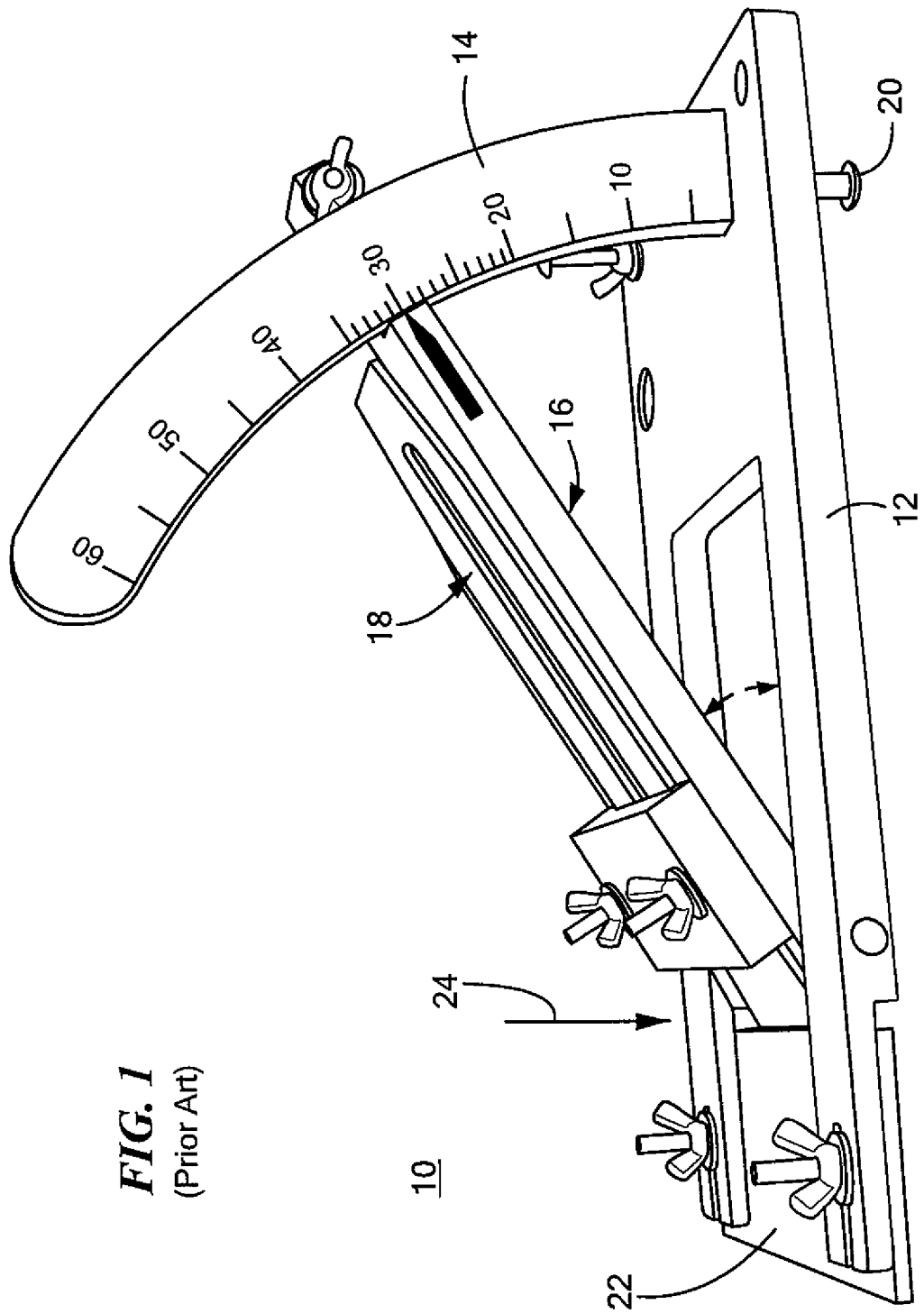
FIG. 1 is a three-dimensional side-view of one example of a conventional universal sharpening jig for a cutting blade which may be used to create a crown on the cutting edge of a cutting blade.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, a sharpening jig, such as sharpening jig 10, FIG. 1, e.g., as disclosed in the '144 patent discussed above, or similar type sharpening jig, may be utilized to sharpen and create a crown in the cutting edge of the cutting blade. Sharpening jig 10 includes baseplate 12, protractor plate 14, and incline plate 16 hingedly coupled to baseplate 12. Incline plate 16 is configured to secure cutting blade 18, e.g., a cutting blade for use with a hand plane or similar type cutting blade to sharpening jig 10. Sharpening jig 10 also includes push plate 22 which positions a user-applied force 24 to reduce destabilizing moments. Sharpening jig 10 also includes one or more glides, e.g., glide 20, coupled proximate the back of baseplate 12. One or more glides 20 is configured to longitudinally and/or level baseplate 12 with respect to a level abrasive surface, e.g. a diamond-coated sharpening plate or stone, to allow movement of sharpening jig 10 by the user to sharpen cutting blade 18 and create a crown in the cutting edge of cutting blade 18.

Figure 2:
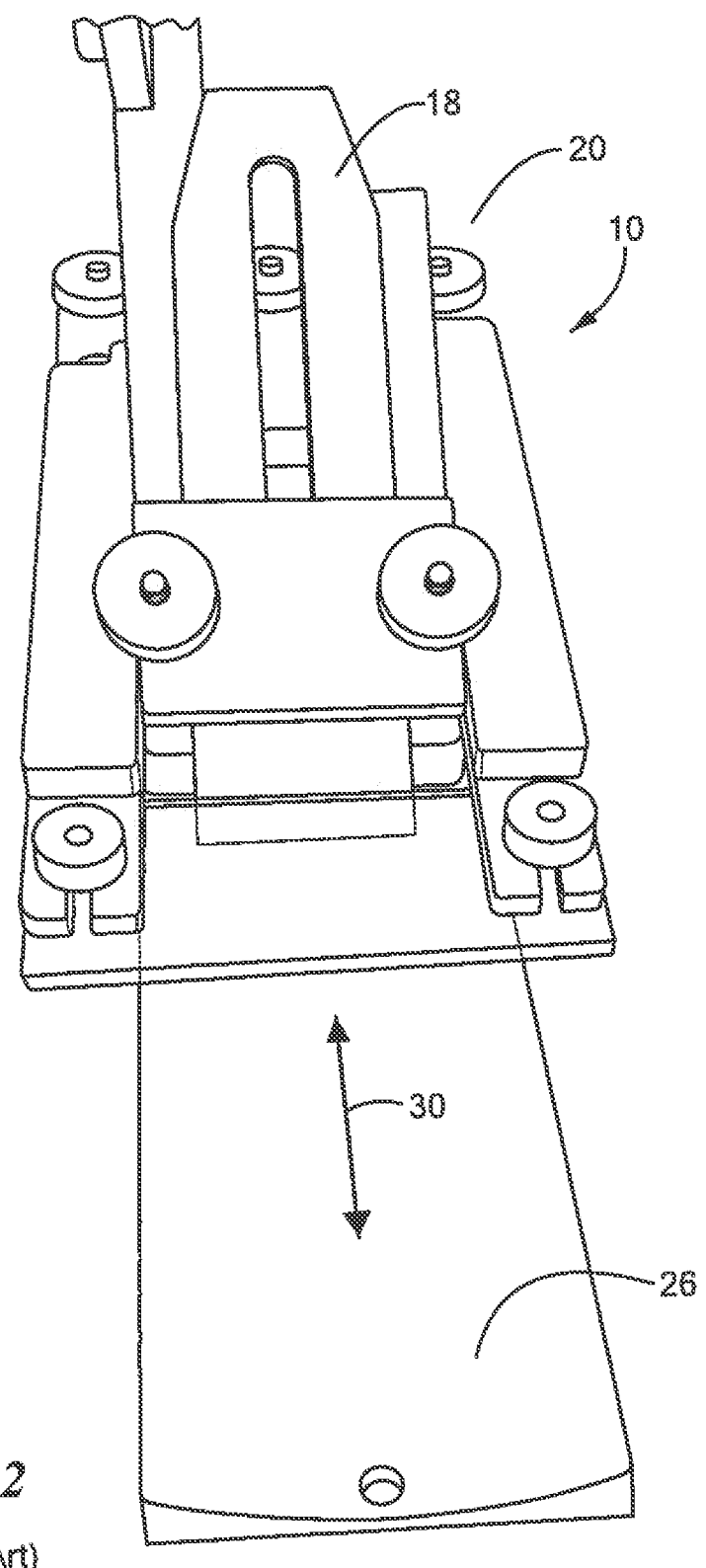
FIG. 2 is a three-dimensional front-view of the sharpening jig shown in FIG. 1 using a large sized diamond-coated curved sharpening plate to create a crown in the cutting edge of a cutting blade.
Figure 3:
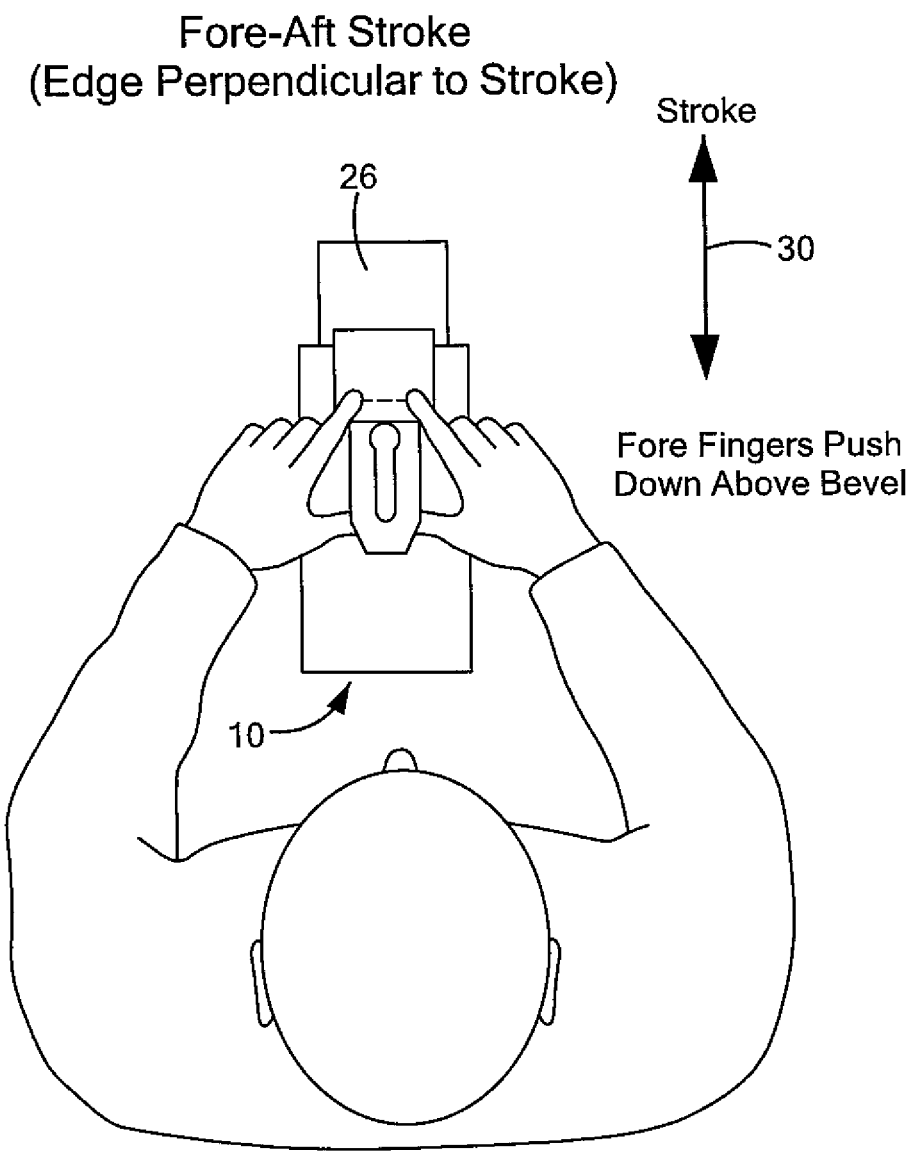
FIG. 3 is a schematic top-view showing an example of fore-and-aft stroke used to create a crown on the cutting edge of the cutting blade with the sharpening jig shown in FIGS. 1 and 2.

As discussed in the Background section, in one example, sharpening jig 10 may be used with large-sized curved diamond-coated sharpening plate 26, FIG. 2, having a concaved curved surface with large radius about the longitudinal cylindrical axis of plate 26, e.g., in the range of about 150 inches to about 600 inches to create a crown in the cutting edge of a cutting blade 18. In operation, sharpening jig 10 with cutting blade 18 is moved fore-and-aft in the longitudinal direction indicted by arrow 30, on diamond-coated curved sharpening plate 26, e.g., as shown in FIG. 3, to create a crown on the cutting edge of cutting blade 18, e.g., crown 38 on cutting edge 39 of cutting blade 18.

As discussed in the Background section above, large-sized diamond-coated curved sharpening plate 26 is very expensive. To reduce the cost associated with large-sized diamond-coated sharpening plate 26, a series of narrow-width, smaller-sized less expensive, diamond-coated sharpening plates of progressively smaller grit sizes and having a concaved curved surface with a similar large radius as discussed above, which, in this example, is about the transverse cylindrical axis of the smaller-sized sharpening plates, may be utilized with sharpening jig 10 to create crown 38, FIG. 4 on cutting edge 39 of cutting blade. 18 FIG. 5 shows one example of a series of smaller-sized diamond-coated sharpening plates 40, 42, 44, and 46, each having a concave shape, as discussed above. In this example, diamond-coated sharpening plate 40 has a grit size of about 60μ, diamond-coated sharpening plate 42 has a grit size of about 45μ, diamond-coated sharpening plate 44 has a grit size of about 25μ, and diamond-coated sharpening plate 46 has a grit size of about 9μ.

Figure 6:
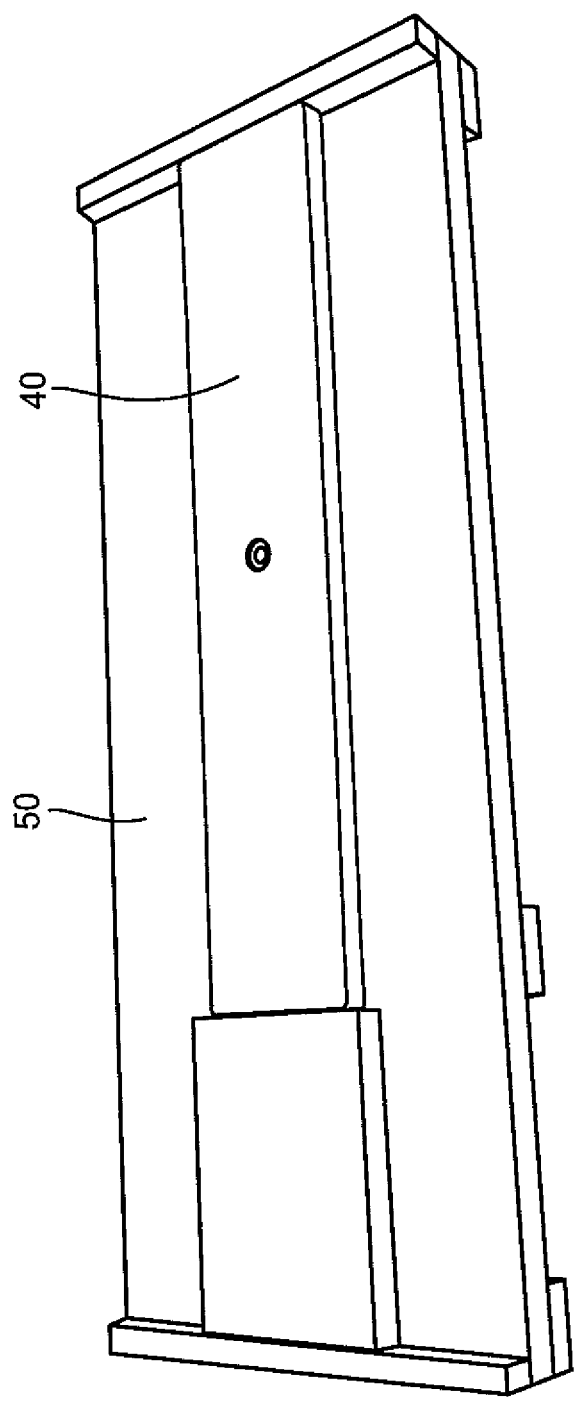
FIG. 6 is a three-dimensional front-view showing an example of one of the smaller-sized diamond-coated sharpening plates shown in FIG. 5 in place in a securing device utilized with the sharpening jig shown in FIG. 1.
Figure 7:
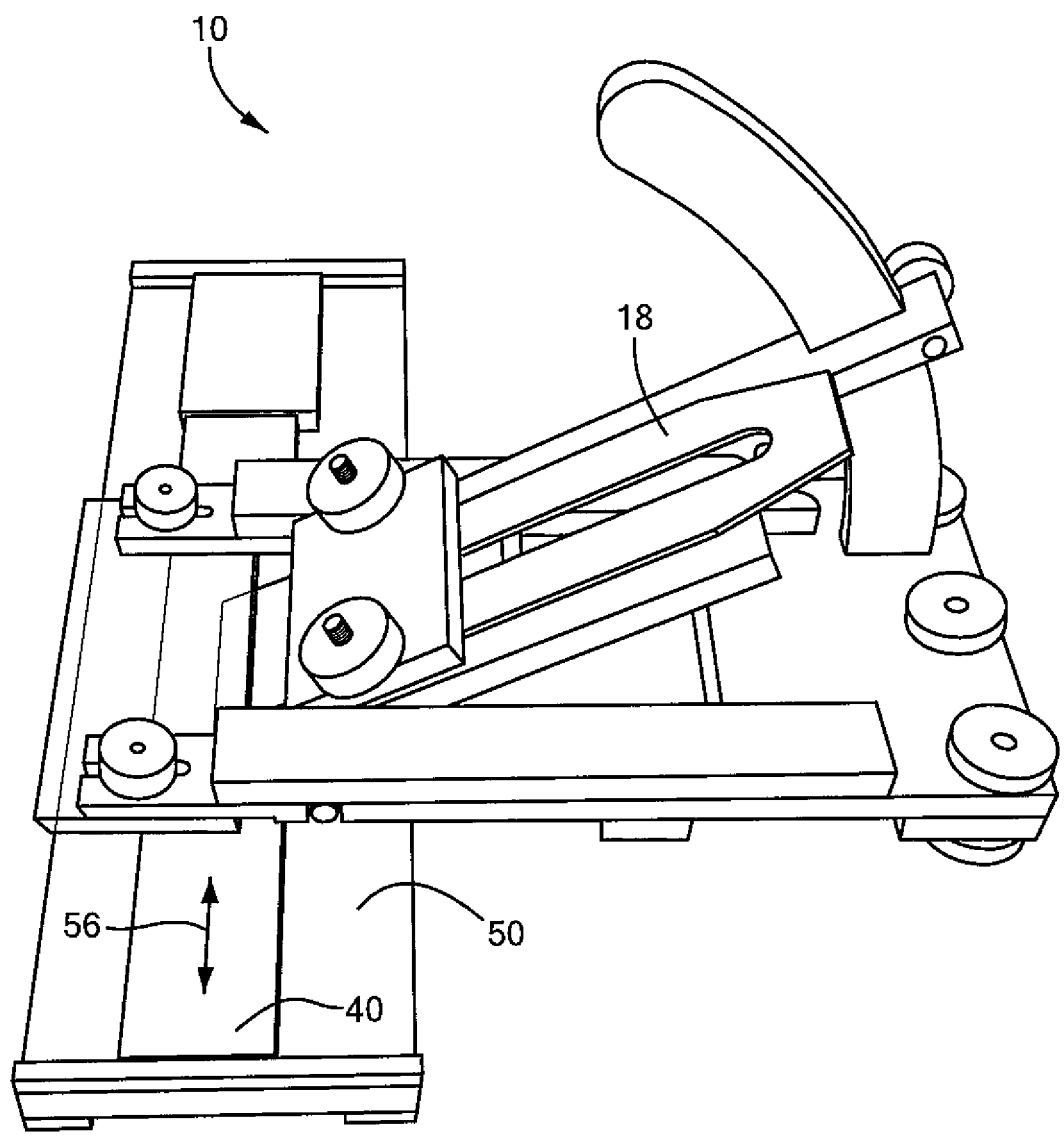
FIG. 7 is a three-dimensional top-side-view showing an example of the sharpening jig shown in FIG. 1 using a smaller sized diamond-coated curved sharpening plate to create a crown in the cutting edge of a cutting blade.
Figure 8:
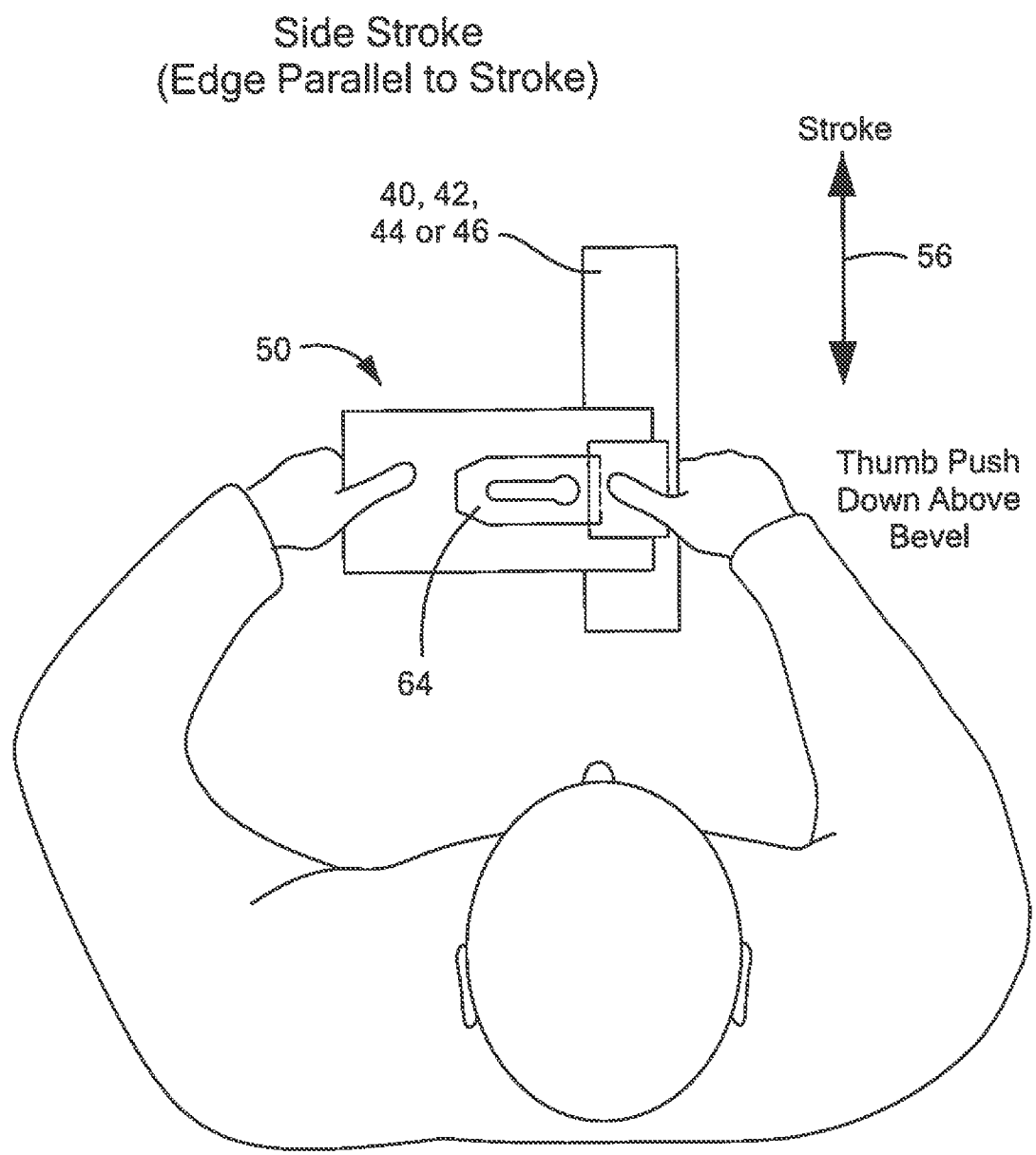
FIG. 8 is a schematic top-view showing in further detail the side-stroke utilized to create a crown in the cutting edge of the cutting blade with the sharpening jig shown in FIG. 7.

In operation, each of smaller sized diamond-coated sharpening plates 40, 42, 44, and 46 are typically placed in securing and elevating device 50, FIG. 6, in this example, diamond-coated sharpening plate 40. Securing device 50 with the smaller-sized diamond-coated sharpening plate 40 (or one of smaller-sized diamond-coated sharpening plates 42, 44, or 46) is then placed proximate the front of sharpening jig 10 with cutting blade 18 attached thereto as shown in FIG. 7. The user then side-strokes sharpening jig 10 in the direction indicated by arrow 56, e.g., as shown in greater detail in FIG. 8, to create crown 38, FIG. 4, in cutting edge 39 of cutting blade 18.

However, each of smaller-sized diamond-coated sharpening plates 40, 42, 44, and 46 is also expensive and a set of four is very expensive.

Figure 9:
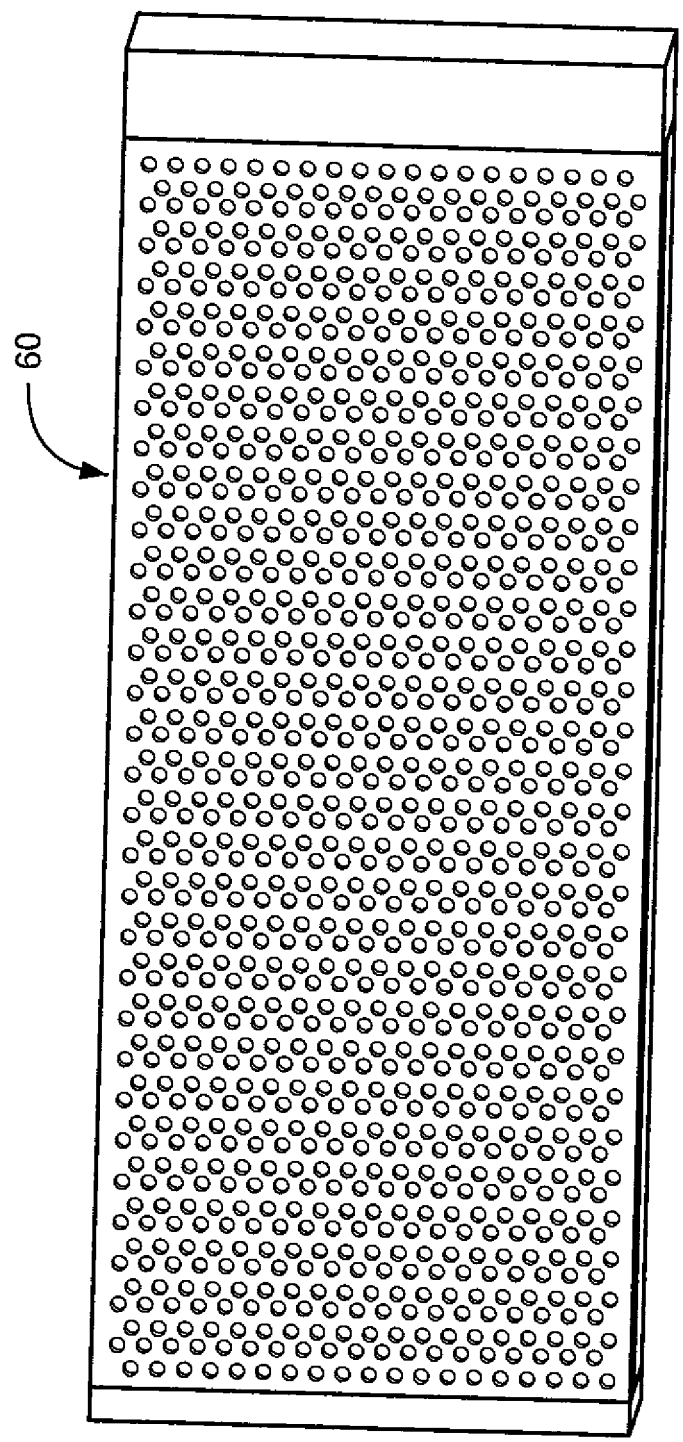
FIG. 9 is a three-dimensional top-view showing an example of a conventional flat sharpening plate.
Figure 10:
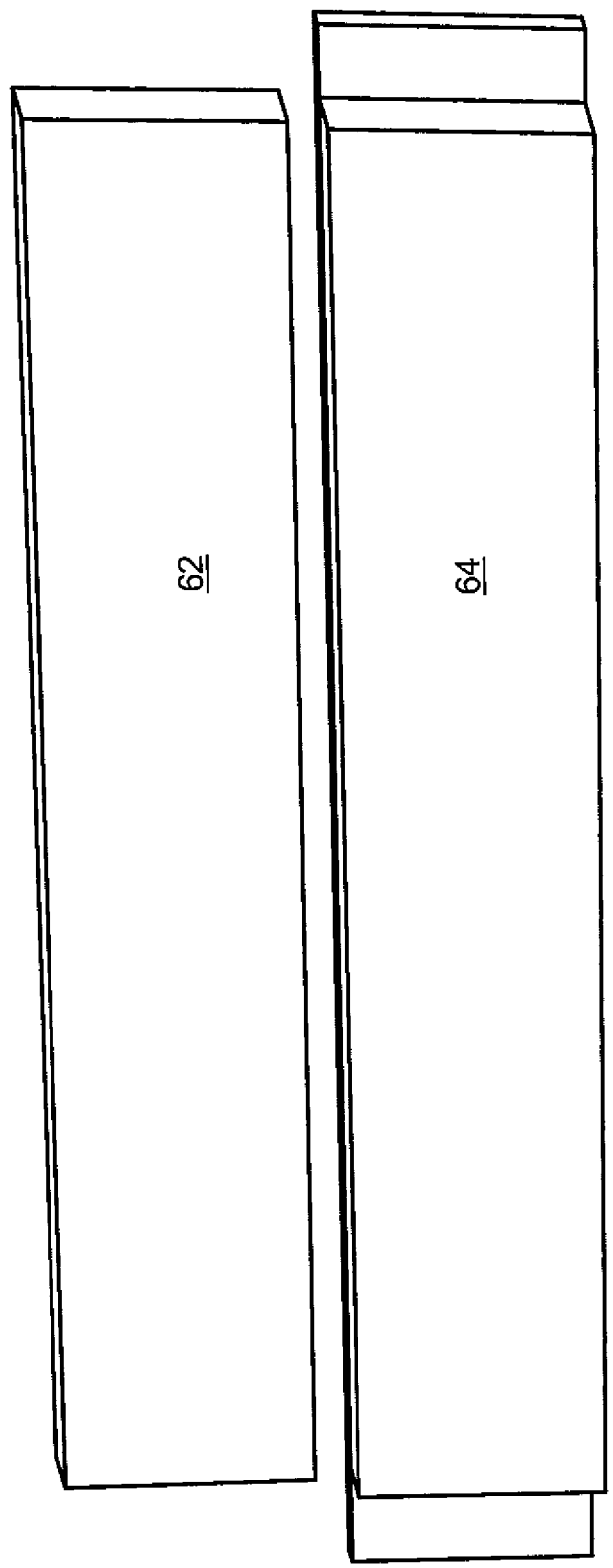
FIG. 10 is a three-dimensional top-view showing examples of conventional flat sharpening stones.

Most hobbyists and professional woodworkers typically own typically flat sharpening plates and stones, e.g., flat sharpening plate 60, FIG. 9 and/or flat sharpening stones 62 and 64, FIG. 10.

Figure 11:
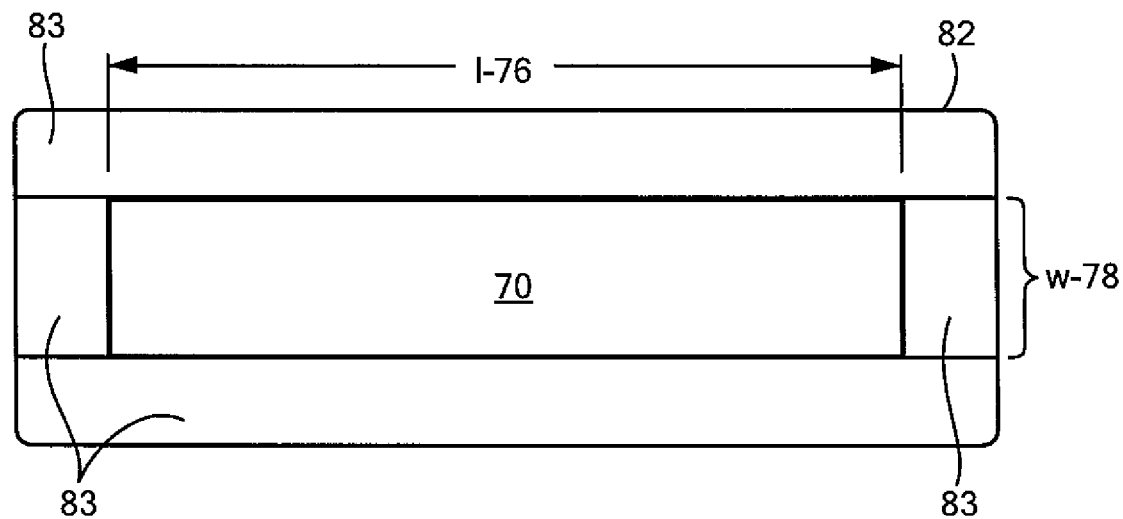
FIG. 11 is schematic top-view of one embodiment of the glideway crowning plate and method thereof for creating a crown on the cutting edge of a cutting blade with flat sharpening stone or plate and a sharpening jig.
Figure 12:
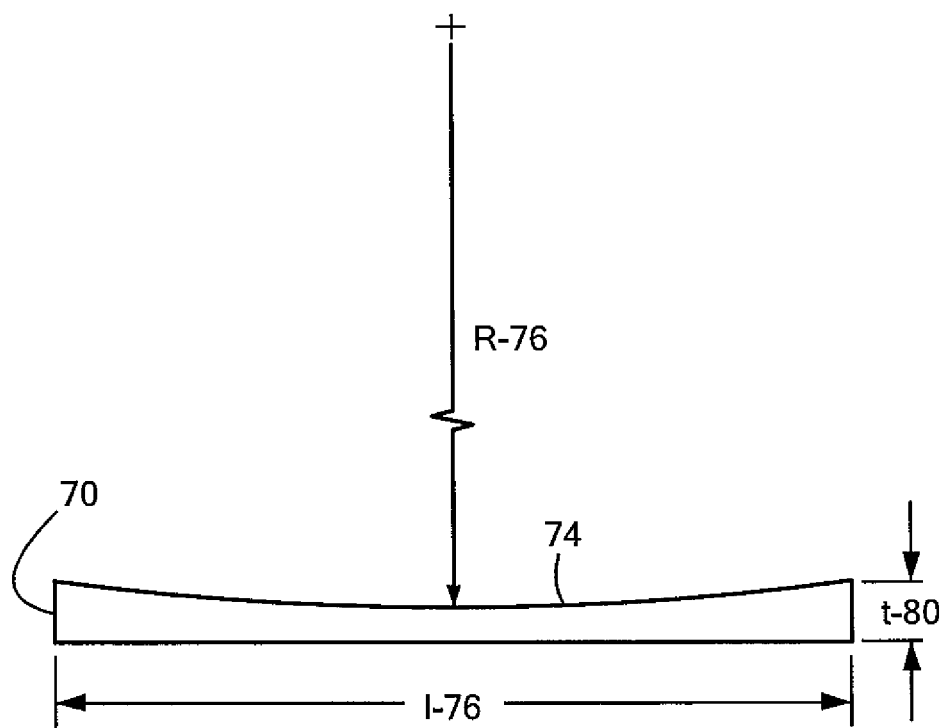
FIG. 12 is a schematic side-view showing in further detail the curved surface of the glideway crowning plate shown in FIG. 11.

Glideway crowning plate 70, FIG. 11, and the method thereof; for creating a crown on a cutting edge of a cutting blade of one embodiment of this invention includes concave curved surface 74, FIG. 12, of a predetermined radius, e.g., radius r-76. In one example, radius r-76, is preferably in the range of about 150 inches to about 480 inches. In another example, radius r-76, is preferably about 450 inches. In one example, glideway crowning plate 70 has a length l-76, FIGS. 11 and 12, of about 8 inches, a width, w-78, FIG. 11, of about 1.5 inches, and a thickness, t-80, FIG. 12, of about ¼ inches. In one example, glideway crowning plate 70 is made of steel or similar type materials.

Figure 13:
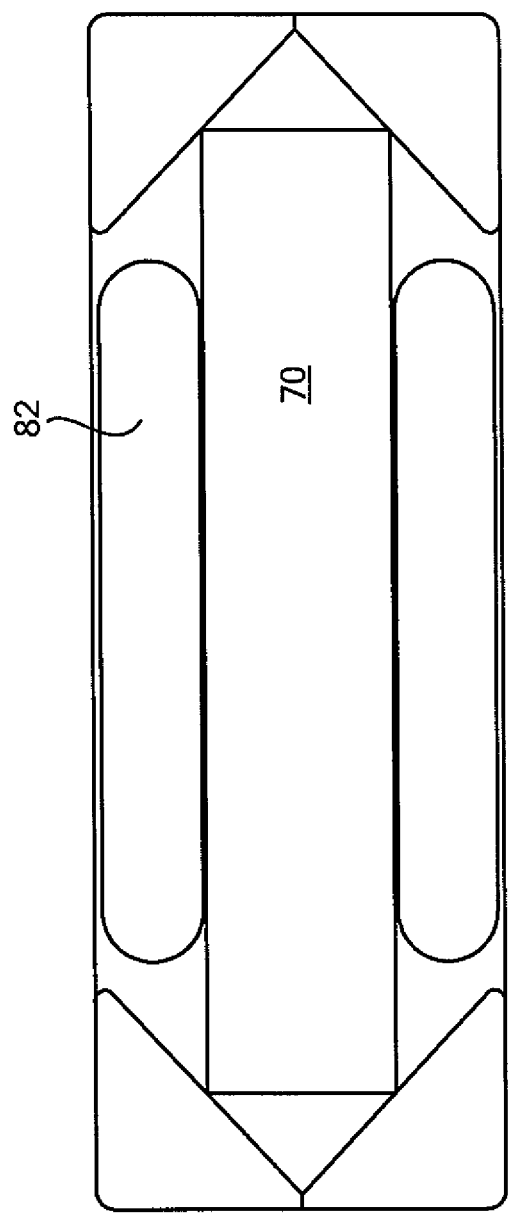
FIG. 13 is a three-dimensional bottom-view of the glideway crowning plate and method thereof for creating a crown on the cutting edge of a cutting blade with a sharpening jig shown in FIGS. 10-12.
Figure 14:
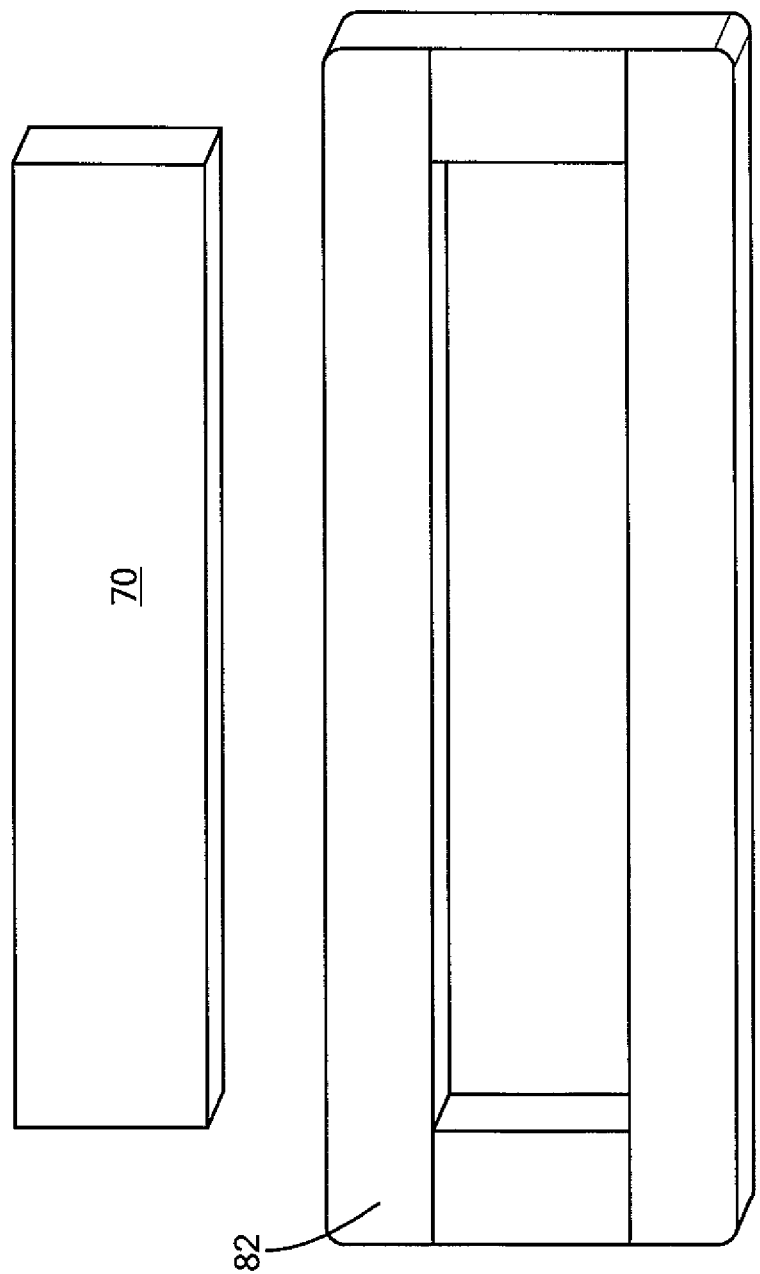
FIG. 14 is a three-dimensional top-front-view showing the curved glideway shown in one or more of FIGS. 10-13 removed from the drop-off prevention device.

In one design, drop-off prevention device 82, FIG. 11, may be utilized with glideway crowning plate 70. In this example, glideway crowning plate is placed in drop-off prevention device 82 as shown and secured to a work surface. Drop-off prevention device is configured to prevent unintended drop-offs and shifting of the sharpening jig from glideway crowning plate during sharpening, as discussed below. Securing device 82 may be made of wood as shown or made of plastic or similar type material. FIG. 13, where like parts include like numbers, shows a back view glideway crowning plate 70 and the back of securing device 82. FIG. 14 shows an example of glideway crowning plate 70 removed from drop-off prevention device 82. Although glideway crowning plate 70 is preferably utilized with drop-off prevention device 82, glideway crowning plate 70 may be utilized without drop-off prevention device 82.

Figure 15:
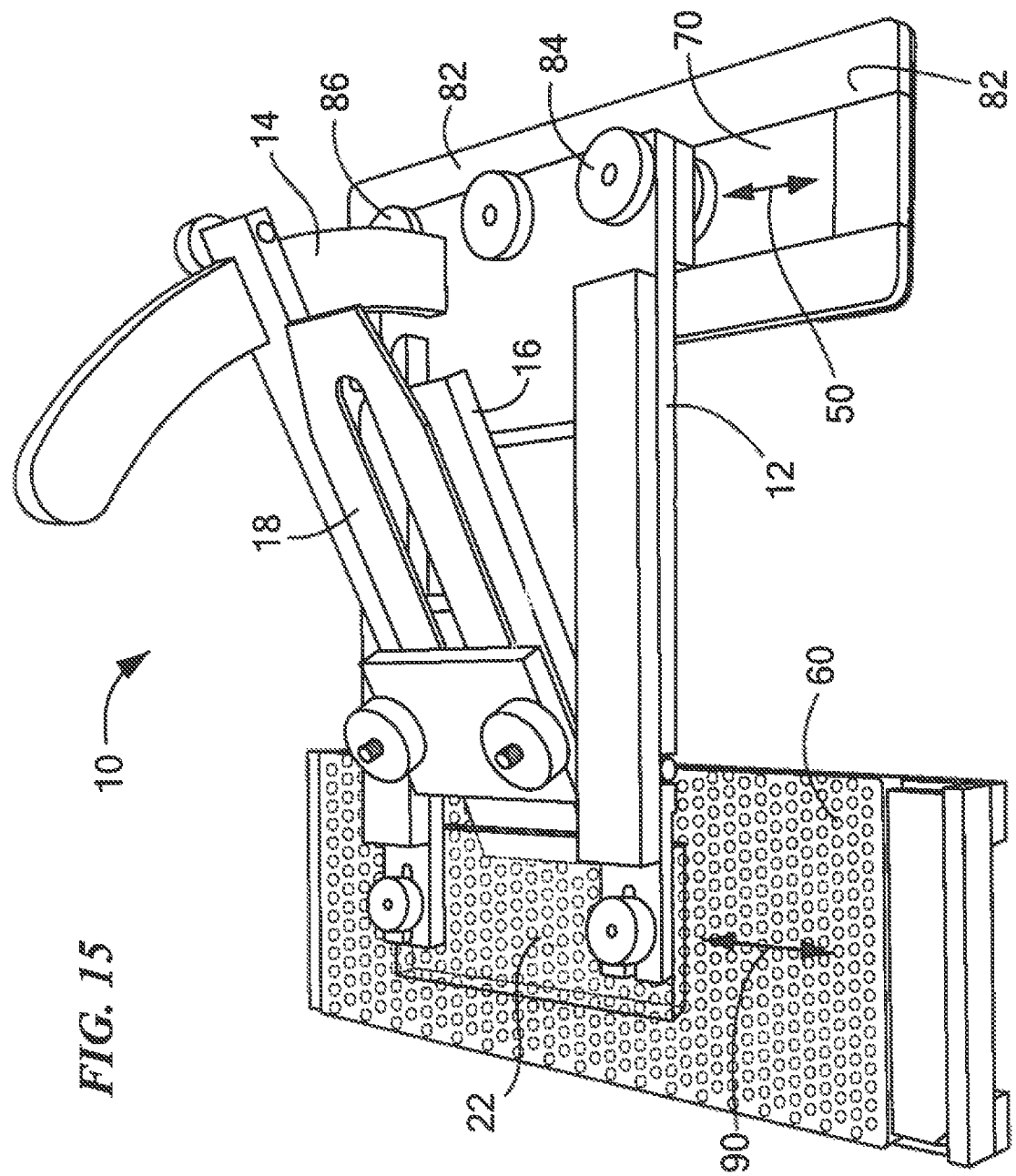
FIG. 15 is a three-dimensional side-view showing an example of the glideway crowning plate and method thereof for creating a crown in the cutting edge of a cutting blade shown in one or more of FIGS. 11-14 in place proximate the back of a sharpening jig and a conventional flat sharpening plate in place at the front of the sharpening jig.
Figure 16:
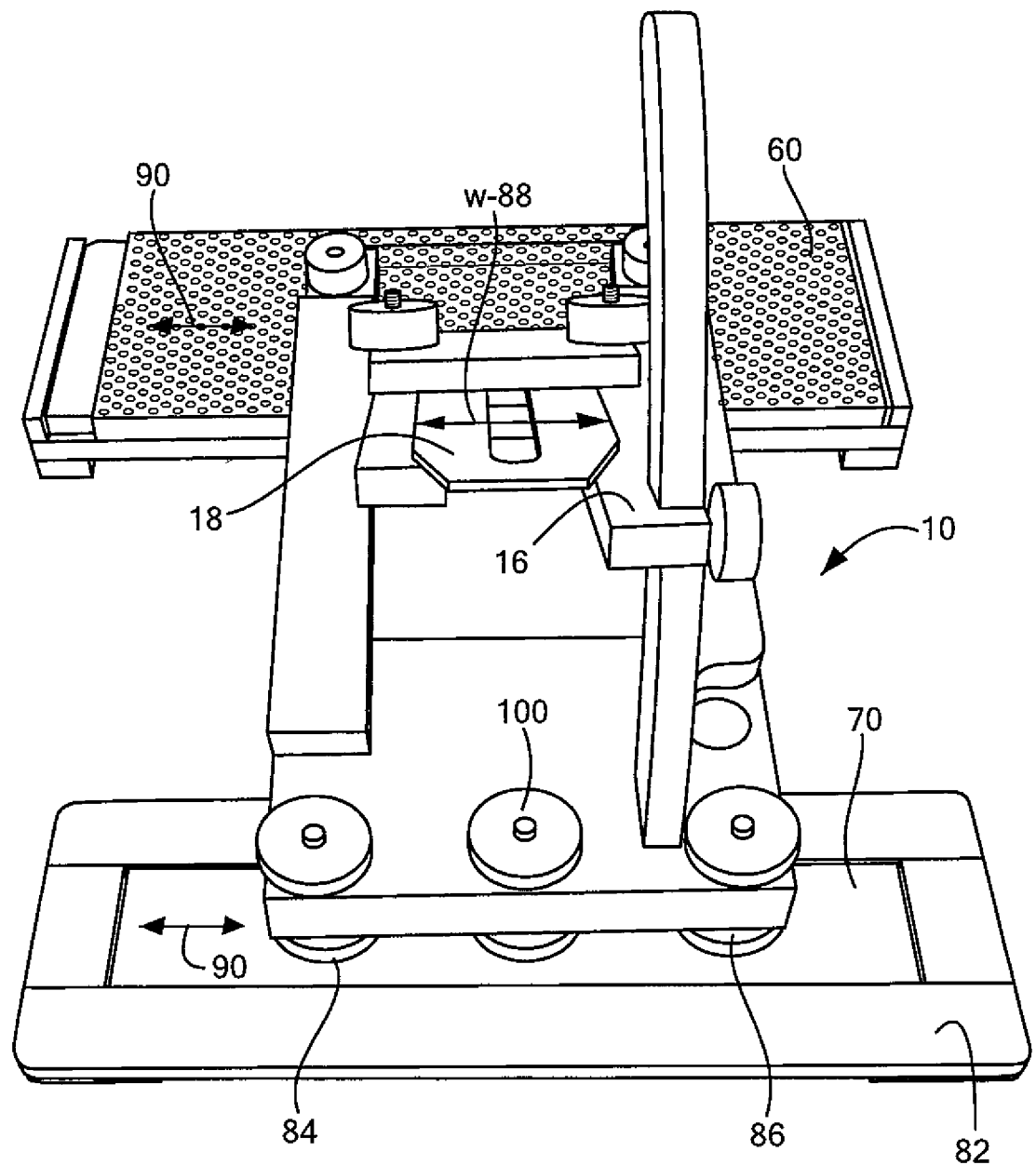
FIG. 16 is a three-dimensional rear-view of the glideway crowning plate and method thereof for creating a crown in the cutting edge of a cutting blade and sharpening jig shown in FIG. 15.
Figure 17:
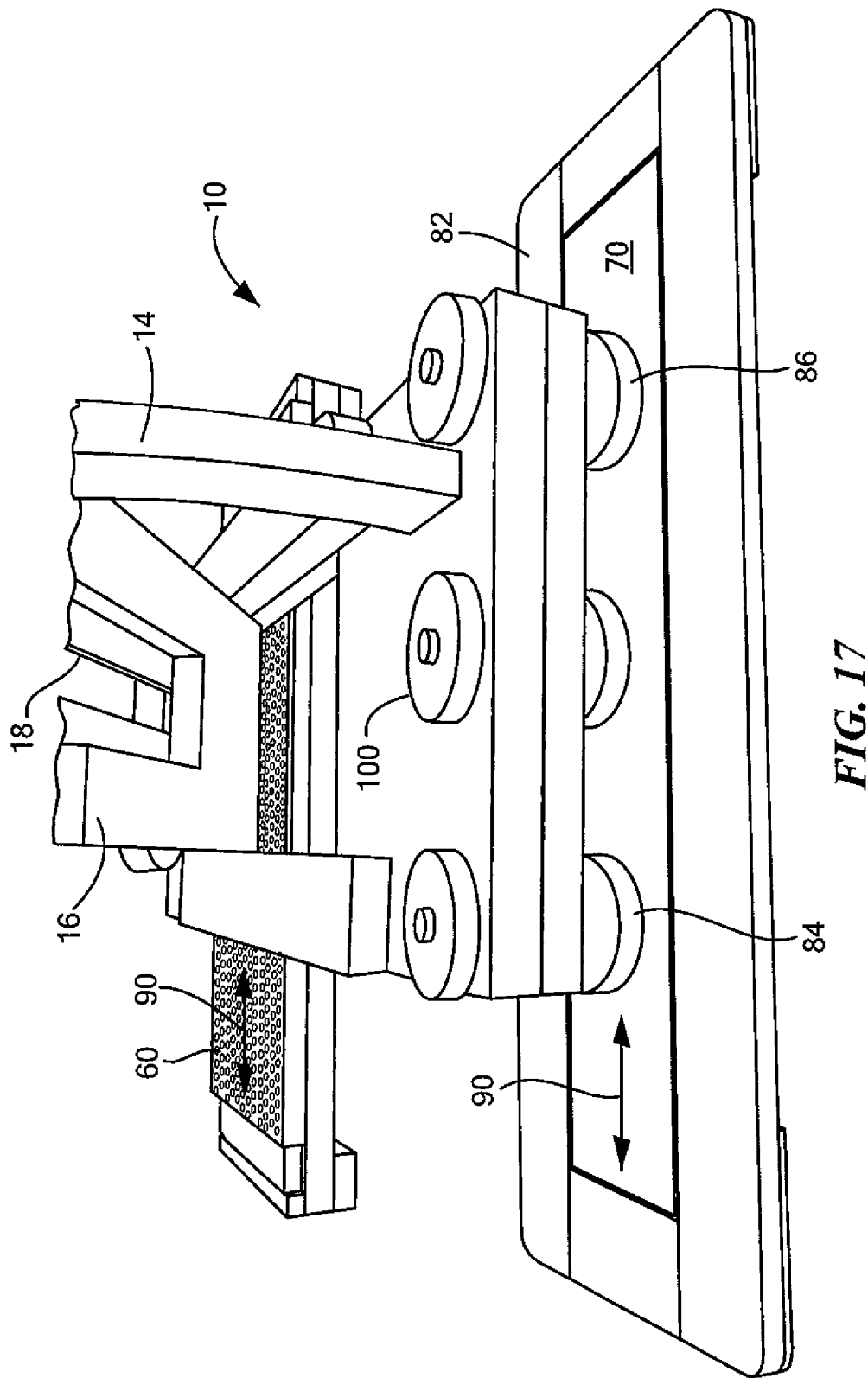
FIG. 17 is a three-dimensional rear-view of the glideway crowning plate and method thereof for creating a crown in the cutting edge of a cutting blade with the flat sharpening plate and sharpening jig shown in FIG. 15.
Figure 18:
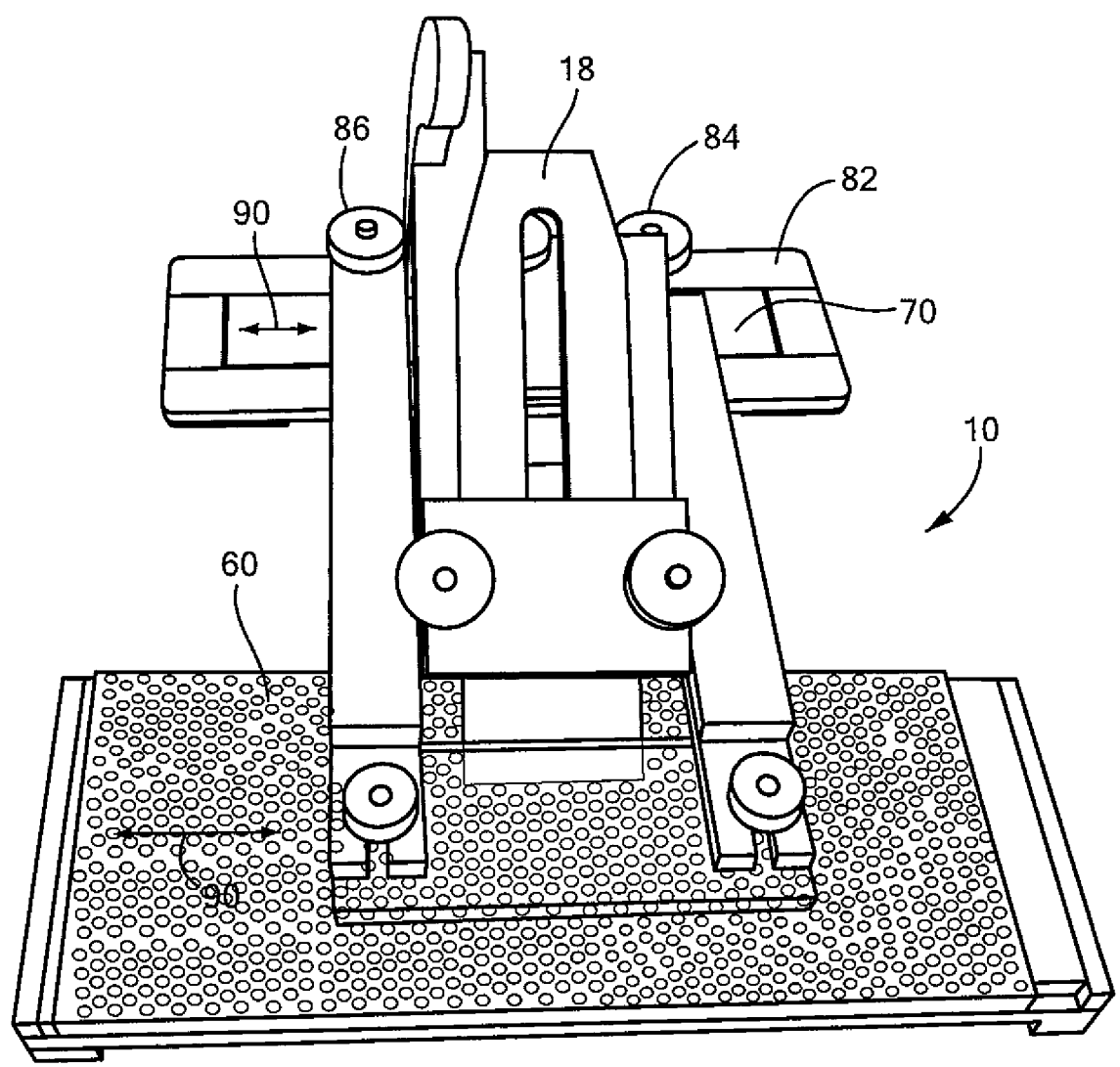
FIG. 18 is a three-dimensional front-view of the glideway crowning plate and method thereof for creating a crown in the cutting edge of a cutting blade and sharpening jig shown in FIGS. 15-17 showing in further detail the glides of the sharpening jig in place on the glideway crowning plate.

Glideway crowning plate 70, preferably with drop-off prevention device 82, is placed proximate the back of sharpening jig 10, e.g., as shown in FIG. 15, having a similar design to sharpening jig 10, FIG. 1, and placed proximate one or more vertically adjustable spaced glides 84 and 86, FIG. 15, of sharpening jig 10 with cutting blade 18 secured to incline plate 16. FIGS. 16 and 17 show in further detail one example of spaced glides 84 and 86 of sharpening jig 10 in place on glideway crowning plate 70. Preferably, spaced glides 84 and 86 are spaced further than width w-88, FIG. 16, of cutting blade 18. In this example, glide 100 of sharpening jig 10 is preferably not utilized and is in the retracted position as shown in FIG. 17. FIG. 18 shows a front view of conventional inexpensive flat sharpening plate 60 placed proximate the front of sharpening jig 10 and glideway crowning plate 70 placed proximate glides 84 and 86.

Figure 19:
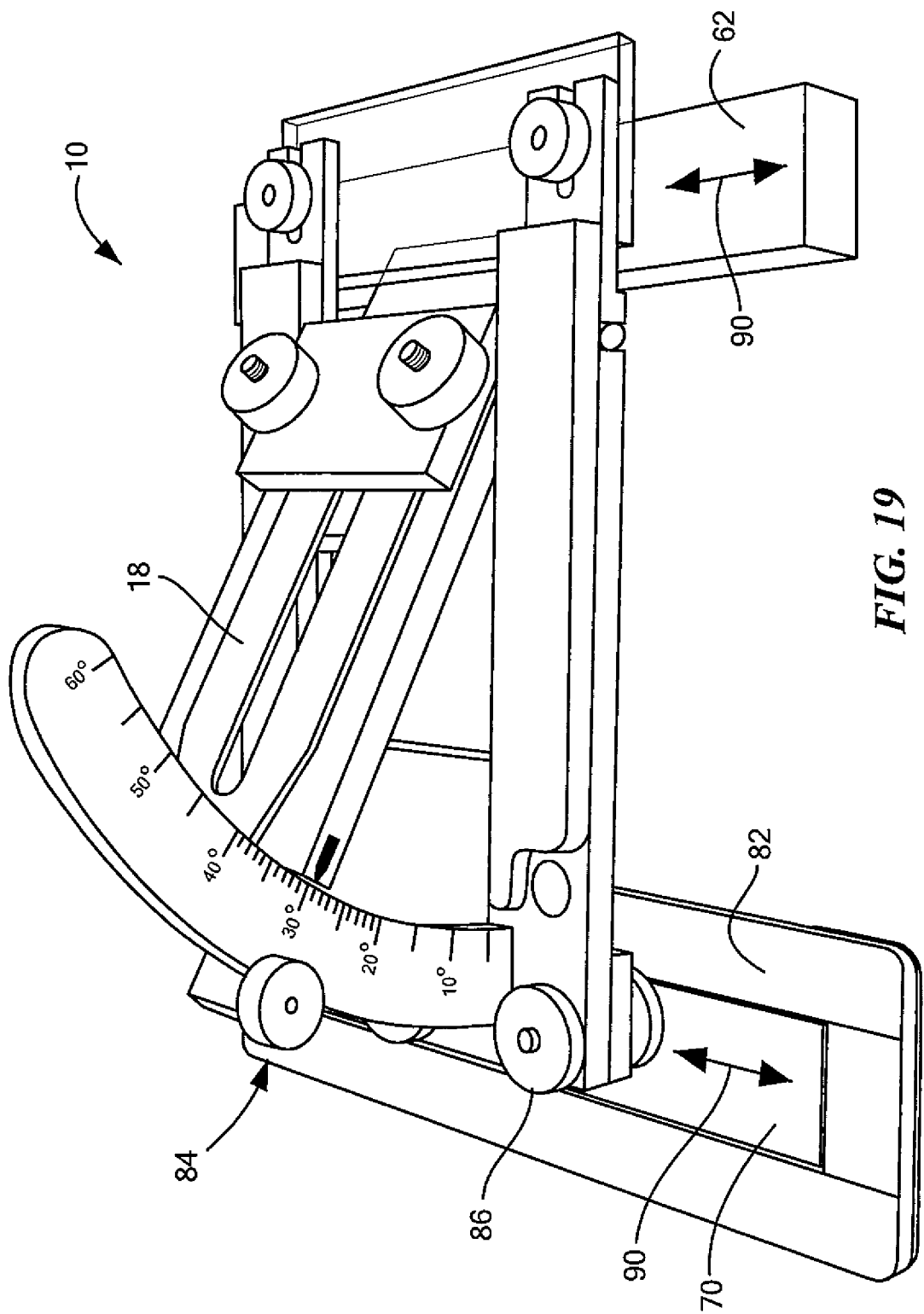
FIG. 19 is a three-dimensional side-view showing an example of the glideway crowning plate and method thereof for creating a crown in the cutting edge of a cutting blade in place at the back of a sharpening jig and a conventional flat sharpening stone in place at the front of the sharpening jig.

In one example, conventional, typically inexpensive, flat sharpening plate 60, FIGS. 15-18, is placed proximate the front of sharpening jig 10, as shown, e.g., on or near push plate 22, FIG. 15. In another example, a conventional inexpensive flat sharpening stone, e.g., conventional inexpensive flat sharpening stone 62, FIG. 19, (or inexpensive flat sharpening stone 64, FIG. 10) may be placed proximate the front of sharpening jig 10 and glideway crowning plate 70 is placed proximate the back of sharpening jig 10 proximate spaced glides 84 and 86 as shown. In one example, drop-off prevention device 82, preferably includes approximately coplanar surfaces 83 extending from the perimeter of glideway crowning plate 70 as shown for taming a possible harsh drop off of the one or more glides 84 and 86, FIGS. 15-19, when sharpening jig 10 is over side-stroked in the direction indicated by arrow 90.

Figure 4:
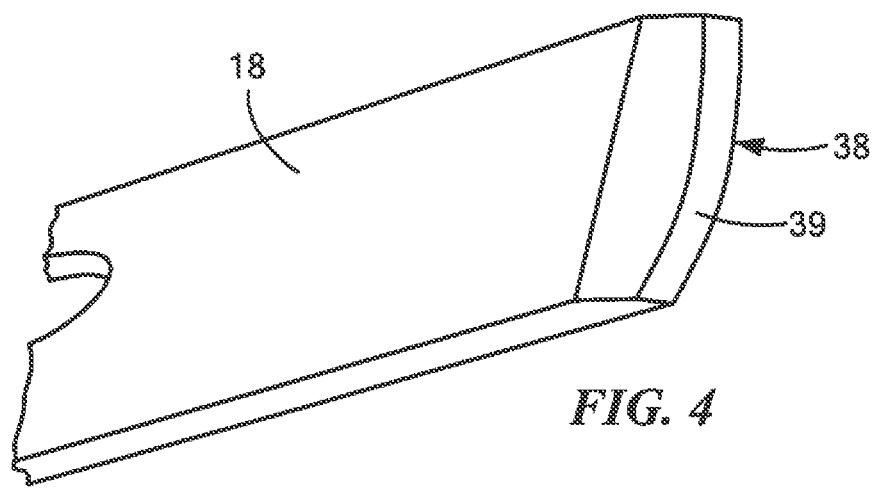
FIG. 4 is a three-dimensional front-view showing one example of a crown on the cutting edge of the cutting blade created with the sharpening jig shown in FIGS. 1 and 2.
Figure 5:
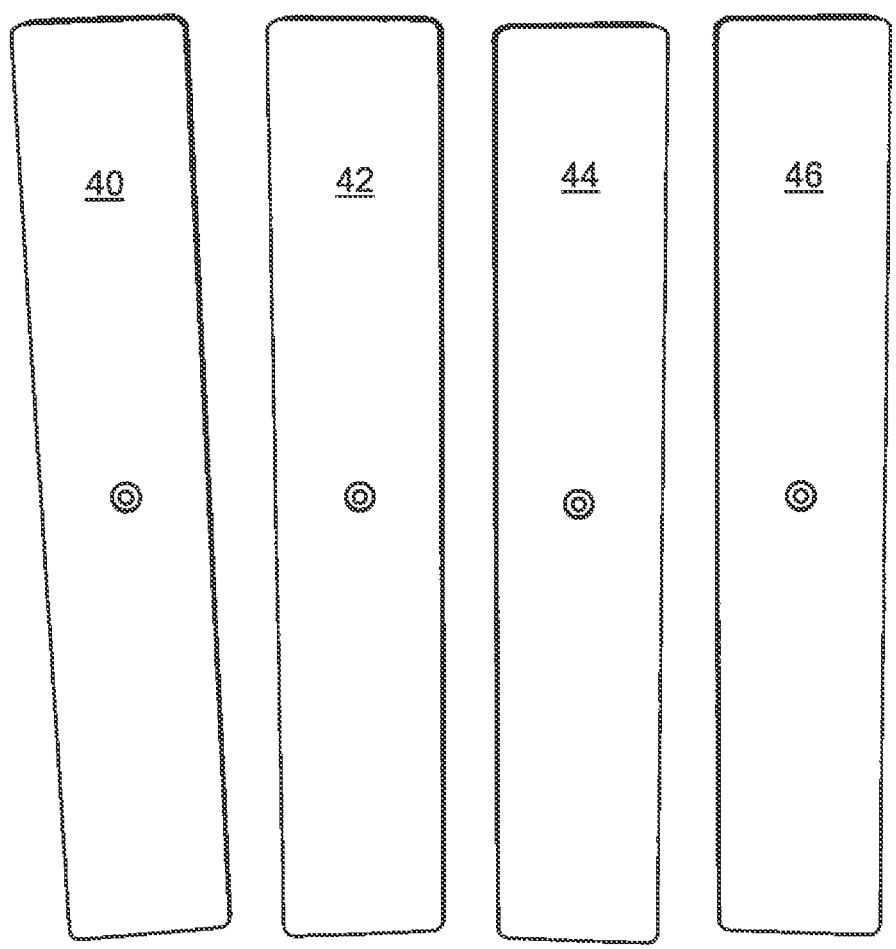
FIG. 5 is a three-dimensional top-view showing a series of conventional smaller-sized concave shaped diamond-coated sharpening plates of progressively smaller grit size which may be utilized to create a crown on a cutting blade for a hand plane with the sharpening jig shown in FIG. 1.

In operation, sharpening jig 10, FIGS. 15-19, is side-stroked on conventional inexpensive flat sharpening plate 60, or sharpening stone 62 or 64, and glideway crowning plate 70 in the direction shown by arrow 90 such that glideway crowning plate 70 imposes a curved path of predetermined radius r-76, FIG. 12, on sharpening jig 10, cutting blade 18, and flat sharpening plate 60 or flat sharpening stone 62 or 64 to create a crown in the cutting edge of cutting blade 18, e.g., crown 38, FIG. 4, in cutting edge 39 of cutting blade 18.

The result is glideway crowning plate 70 and the method thereof shown in one or more of FIGS. 11-19 efficiently and effectively creates a crown in the cutting edge of a cutting blade by imposing curved path of predetermined radius on conventional typically inexpensive flat sharpening plates or flat sharpening stones that most hobbyists and professional woodworkers already own. Thus, glideway crowning plate 70 and the method thereof reduces cost to create a crown in the cutting edge of cutting blade and requires less skill for the hobbyist woodworkers as well as professional woodworkers to create a crown in the cutting edge of a cutting blade.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A glideway crowning plate for creating a crown on a cutting edge of a cutting blade with a sharpening jig, the glideway crowning plate comprising:
   a glideway crowning plate having a concaved curved surface of a predetermined radius placed proximate spaced glides of a sharpening jig, and
   wherein the sharpening jig utilizes a flat sharpening plate or a flat sharpening stone and the sharpening jig with a cutting blade therein is side-stroked on the flat sharpening plate or flat sharpening stone and the glideway crowning plate imposes a curved path of the predetermined radius on the sharpening jig, cutting blade, and flat sharpening plate or flat sharpening stone to create a crown in the cutting edge of a cutting blade.

2. The glideway crowning plate of claim 1 in which the predetermined radius includes a radius in the range of about 180 inches to about 480 inches.

3. The glideway crowning plate of claim 1 in which the predetermined radius has a radius of approximately 450 inches.

4. The glideway crowning plate of claim 1 in which the glideway crowning plate is made of steel.

5. The glideway crowning plate of claim 1 in which the glideway crowning plate has a length of about 8 inches, a width of about 1.5 inches and a thickness of about ¼ inches.

6. The glideway crowning plate of claim 1 further including a drop-off prevention device configured to prevent unintended drop-offs and shifting during sharpening.

7. The glideway crowning plate of claim 1 in which the spaced glides of the sharpening jig are spaced further than the width of the cutting blade.

8. A method for creating a crown on the cutting edge of a cutting blade with glideway crowning plate and a sharpening jig, the method comprising:
   providing a glideway crowning plate including a concave surface of a predetermined radius;
   placing the glideway crowning plate proximate spaced glides of the sharpening jig;
   placing a flat sharpening plate or a flat sharpening stone proximate the front of the sharpening jig, and
   side-stroking the sharpening jig with a cutting blade secured thereto on the flat sharpening stone or the flat sharpening plate such that the glideway crowning plate imposes a curved path of a predetermined radius on the sharpening jig, the cutting blade, and flat sharpening plate or flat sharpening stone to create a crown in the cutting edge of cutting blade.

9. The method of claim 8 in which the predetermined radius includes a radius in the range of about 180 inches to about 480 inches.

10. The method of claim 8 in which the predetermined radius has a radius of approximately 450 inches.

\* \* \* \* \*